United States Patent Office 3,023,143
Patented Feb. 27, 1962

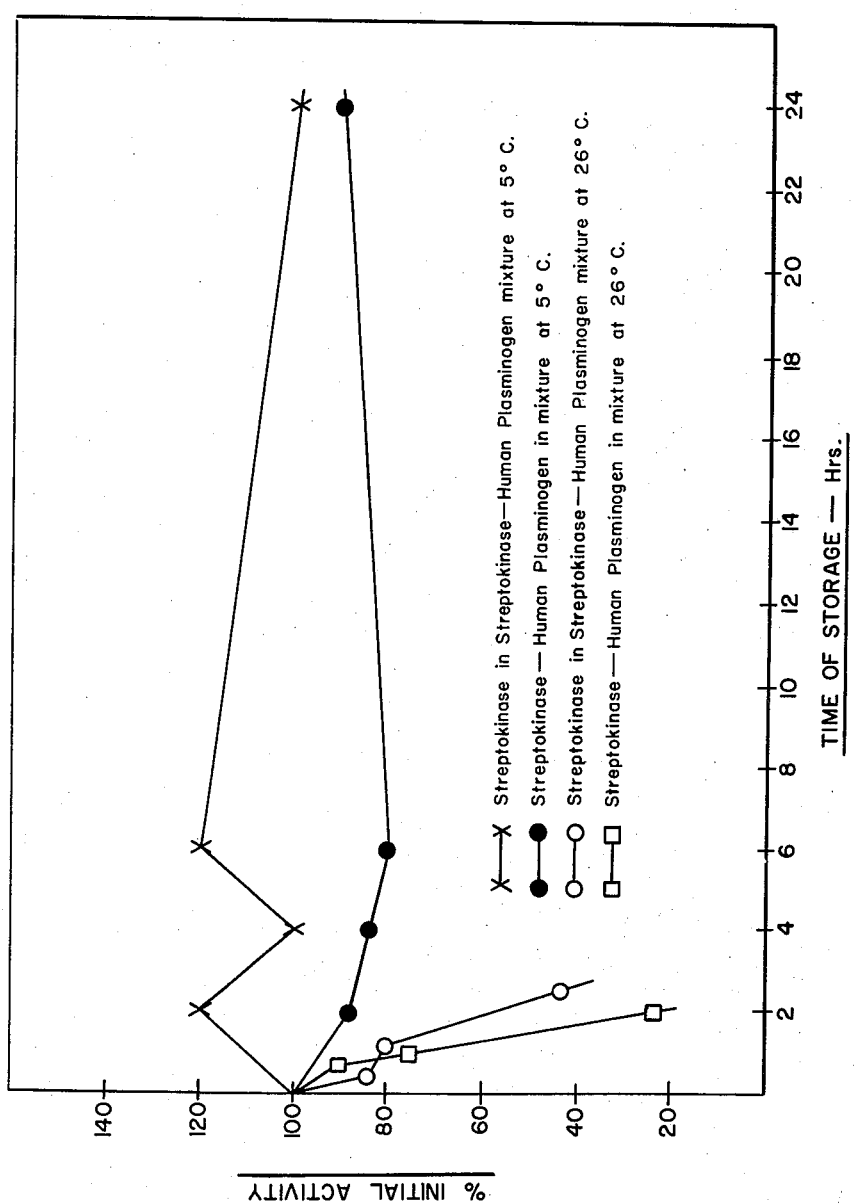

3,023,143
PROCESS FOR PREPARING A VETERINARY COMPOSITION
Frank B. Ablondi, Pearl River, N.Y., James J. Hagan, Cedar Grove, N.J., and Harold L. Easterbrooks, Menden Hall, Pa., assignors to American Cyanamid Company, New York, N.Y., a corporation of Maine
Filed Oct. 14, 1959, Ser. No. 846,366
4 Claims. (Cl. 167—53)

This invention relates to an improved process of preparing a stable composition comprising the enzymes streptokinase-streptodornase and human plasminogen.

The lytic principles, streptokinase and streptodornase, are elaborated by many strains of hemolytic streptococci, chiefly those of group A and Lancefield group C streptococci. Streptokinase-streptodornase provides the medical profession with a biochemical curette that assists the physician in the pre- and post-operative care of wounds and in many instances it can be used in lieu of more radical surgical intervention. Streptokinase assists in the liquefaction of clotted blood and fibrinous exudates apparently by activating the inactive proteolytic enzyme, plasminogen, which exists in the euglobulin fraction of human plasma. The action of streptokinase is to convert the inactive plasminogen to the active plasmin, which lyses fibrin. Clotted blood and fibrinous exudates can thus be liquefied by the addition of streptokinase if sufficient plasma euglobulin is present on which the kinase can act.

Streptodornase, on the other hand, breaks down the desoxyribonucleoproteins, or nuclear debris of pus, and thus liquefies purulent exudates by degradation of the complex viscous protein molecule desoxyribonucleoprotein to smaller molecular weight soluble products. By the action of streptodornase, phagocytosis can proceed normally.

The use of streptokinase-streptodornase as an enzymatic curette for effective human therapy of abscesses, burns, osteomyelitis, sinusitis, thrombophlebitis and other infected lesions has been well recognized in the medical literature.

While the combination of streptokinase-streptodornase has been used in the treatment of this type of inflammation in man, inflammations in domestic animals have been resistant to treatment by streptokinase-streptodornase.

It is known that animal plasma from bovine blood, for example, also contains the inactive proteolytic enzyme, plasminogen, so it might be supposed that the administration of streptokinase-streptodornase to domestic animals would cause conversion of the plasminogen to the active form (plasmin) which, in turn, would cause lysis or fibrinolysis of blood clots. Surprisingly, however, it has been found that streptokinase-streptodornase has little or no effect on the treatment of inflammations in domestic animals.

According to the present invention it has been found that compositions containing a small amount of human plasminogen and the enzymes streptokinase or streptokinase-streptodornase are not only effective in the treatment of inflammation in domestic animals such as dogs, horses, bovines and the like but are stable and can be stored for long periods without loss of potency. When a composition containing streptokinase-streptodornase and human plasminogen is formed, it is an aqueous solution of the ingredients. This solution is extremely unstable at elevated temperatures even those approximating room temperature such as 26° C. According to the present invention the aqueous solution of the constituents is rapidly brought to a temperature not exceeding 5° C. and, preferably, the composition is dried at a temperature of 5° or lower to form a dry product. The mixture of solutions itself is stable if maintained at 5° C. or below but a dry product is more convenient to store and can be readily reconstituted with distilled water for injection. The drying is effected by the freeze drying process in which the solutions are frozen and dried under a vacuum until a dry powder is produced.

The mechanism by which the streptokinase-streptodornase-human plasminogen produces a reversal of the inflammatory effect is not known. The liquefaction of thrombi of fibrin in arteries, veins and lymphatics, however, improves the local circulation.

The invention will be illustrated in the drawings which show curves of stability for streptokinase human plasminogen at 5° C. and at 26° C.

The mixtures, the stability of which is shown in the drawings, are prepared by mixing streptokinase-human plasminogen at the ratio of 250:1. The potency is given in activity units.

It is preferred, though not essential, that a suitable chemotherapeutic agent, or broad-spectrum antibiotic, such as chlortetracycline or tetracycline be given systemically when treatment with the novel composition of this invention is given since the bacteriostatic or bactericidal effects of these drugs are often necessary in the treatment and healing of many inflammatory lesions.

While pure streptokinase may be used alone with the human plasminogen, it is not necessary to use such a purified and relatively more expensive form of the enzyme. For example, satisfactory results have been obtained using the mixture of streptokinase-streptodornase obtained by the fermentation process disclosed in the Ablondi et al. Patent No. 2,701,227.

The ratio of enzyme to human plasminogen in our composition is calculated on the basis of the units of streptokinase present. In general, we have found that the ratio of the two components of our composition may vary from 1 unit of human plasminogen to 1–500 units of streptokinase and preferably from 20 to 200 units of streptokinase. The preferred ranges of streptokinase result in ratios of streptokinase to human plasminogen of from slightly over 500 to slightly under 140. These ranges include the most active compositions. Thus, it will be seen that a very small amount of human plasminogen is necessary for activation by the streptokinase.

A unit of streptokinase may be defined as that amount of streptokinase which activates sufficient plasminogen to produce enough plasmin to bring about dissolution or liquefaction of a standard fibrin clot formed from bovine fibrinogen and thrombin in 10 minutes at 37° C. Christensen, J. Clin. Investigation, 28:163–172, Jan. 1949.

A unit of human plasminogen may be defined as that quantity of plasminogen which when added to a constant mixture of excess streptokinase, bovine plasminogen and lysine ethyl ester will effect a given hydrolysis of the lysine ethyl ester at 37° C. in one hour.

One dosage unit, for purposes of this invention, may be defined as a composition containing 1,000 units of human plasminogen activated with 100,000 units of streptokinase, the ratios of streptokinase to human plasminogen as set forth above.

A composition suitable for veterinary use, as described above, may be prepared by mixing a solution of streptokinase-streptodornase and human plasminogen previously cooled and maintained at 5° C. or lower while mixing, maintaining the temperature at 5° C. or lower until dried to a powder by freeze drying under vacuum. This dry product, which is readily reconstituted and dissolved by the addition of water or saline or buffer, retains its activity in storage for at least a year, there being no significant loss of potency even if maintained at temperature of 37° C.

In using the novel composition of this invention, the previously described streptokinase-streptodornase and human plasminogen dried powder is reconstituted in water, saline or a saline solution buffered at a pH of around 6.8–7.8 so that the final concentration (in terms of streptokinase content) of components is about 100 to 100,000 units of streptokinase-streptodornase per milliliter of solution. The composition, when gently shaken to effect solution, is ready for use and may be administered by various routes such as intravenously, intramuscularly or topically.

The novel composition of this invention has been used successfully by injection by veterinary trials on domestic animals in the treatment of inflammations in such diseases and injuries diagnosed as cellulitis and periostitis-tibial, septic-arthritis, abscesses, osteitis, myositis and radial periostitis, chronic bronchitis, acute mastitis, etc.

It is an advantage of this invention that it provides for the practical administration of the two essential components needed for the reversal of inflammatory symptoms in animals in one accurate, convenient stable form, thus removing any possibility of contamination or loss of activity as well as errors in measurement of the two components.

This application is in part a continuation of our copending application, Serial No. 580,177, filed April 24, 1956, and now abandoned.

We claim:

1. In a process of producing a veterinary composition containing human plasminogen and streptokinase by forming an aqueous solution of the two components, the improvement which comprises rapidly reducing the temperature of the components to not over 5° C. and preventing contact of the components in the presence of water at higher temperatures.

2. In a process of producing a veterinary composition containing human plasminogen and streptokinase-streptodornase by forming a water solution of the two components, the improvement which comprises rapidly reducing the temperature of the solution to not over 5° C. and preventing contact of the components in the presence of water at higher temperatures.

3. A process according to claim 1 in which the solution is frozen and dried under vacuum to form a dry suitable product.

4. A process according to claim 2 in which the solution is frozen and dried under vacuum to form a dry suitable product.

References Cited in the file of this patent

UNITED STATES PATENTS 2,908,614    Muggleton et al. _____ Oct. 13, 1959

OTHER REFERENCES

Sherry et al.: J. Clin. Invest, 33:10, pp. 1303–1313, October 1954.

Leventhal et al.: J. Am. Veterinary Medical Assoc., 129:9, pp. 422–425, Nov. 1, 1956.

Riley: The North American Veterinarian, vol. 37, pp. 843–847, 849, October 1956.

Varidase: Publ. of American Cyanamid Corp., Lederle Lab. Div., New York, N.Y. (1951), pp. 4–8, especially pp. 5–6.

Drug Trade News, p. 41, Mfg. Sect., Aug. 17, 1953.